No. 841,890. PATENTED JAN. 22, 1907.
J. PEPPER, Jr.
FISH REEL.
APPLICATION FILED JULY 25, 1904.
2 SHEETS—SHEET 2.
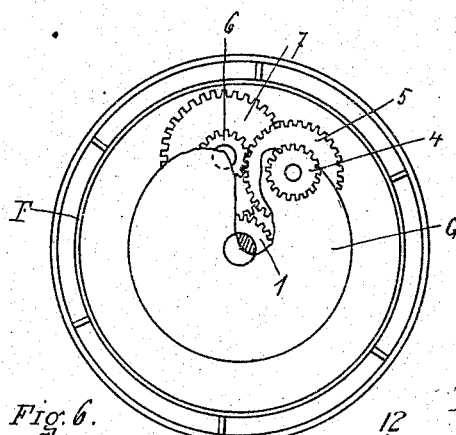
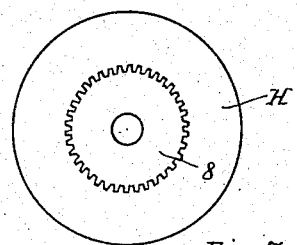
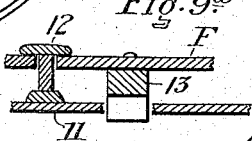
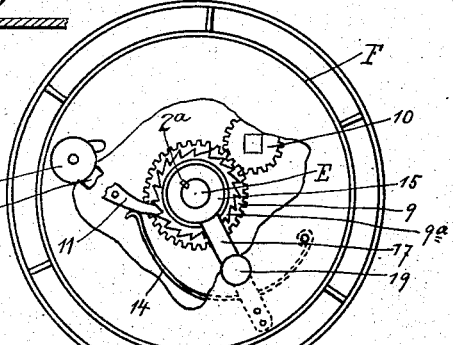
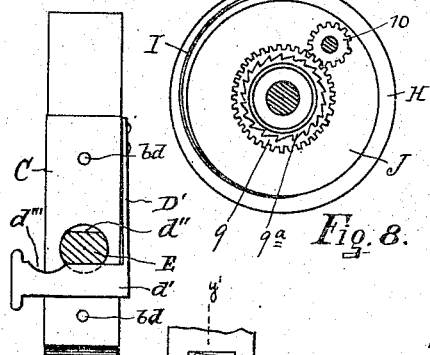
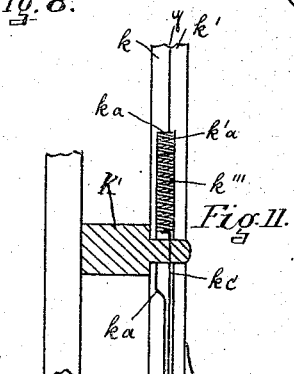
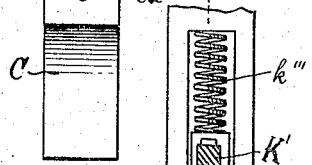
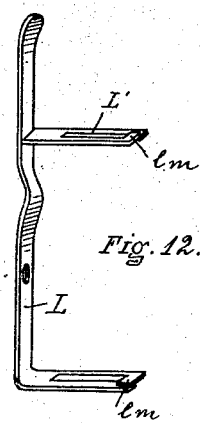
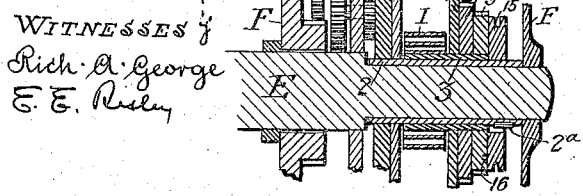
WITNESSES
Rich. A. George
E. E. Risley
INVENTOR
JOHN PEPPER JR.
By Risley & Love
ATTORNEYS.

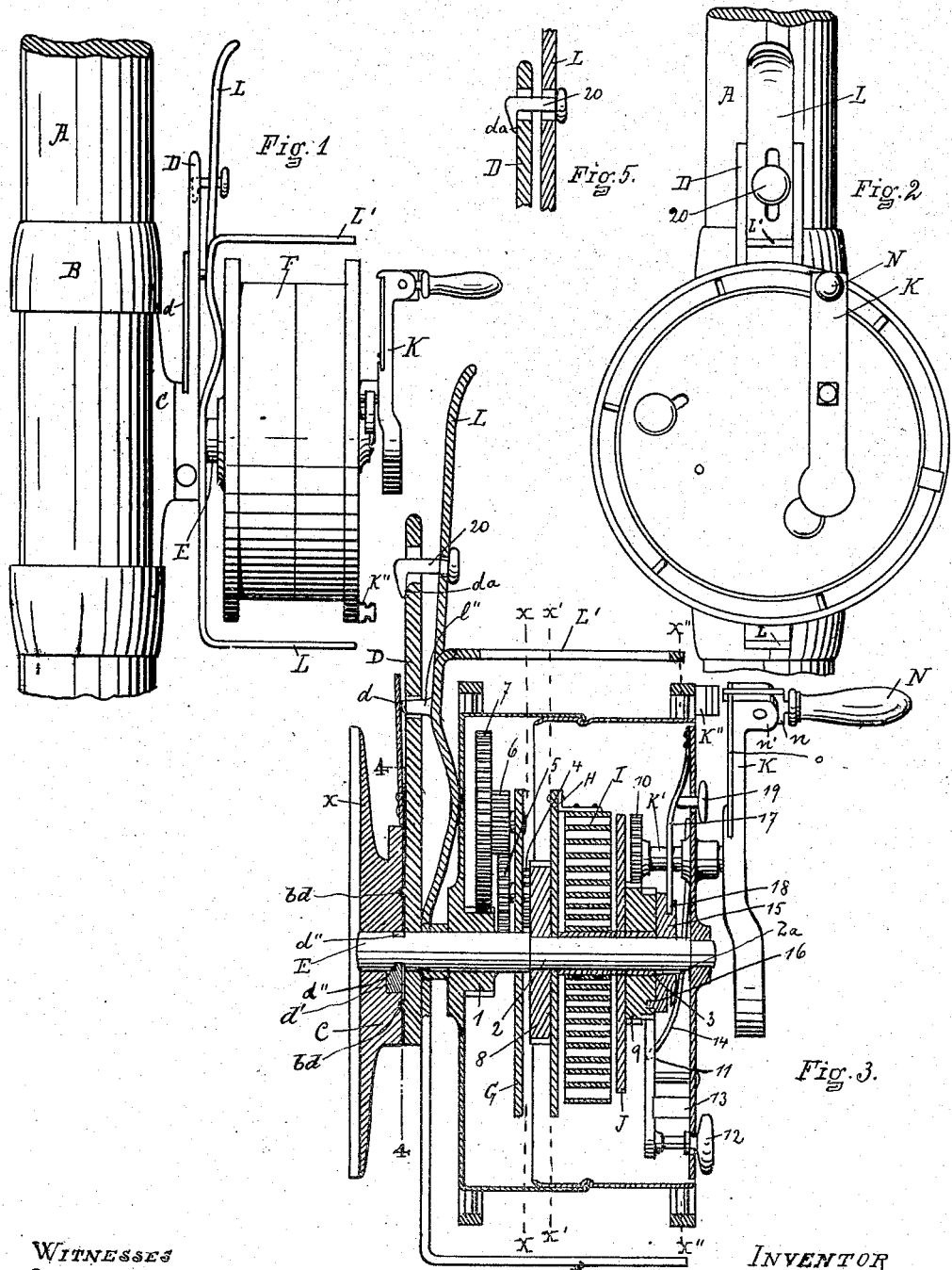

UNITED STATES PATENT OFFICE.

JOHN PEPPER, JR., OF UTICA, NEW YORK.

FISH-REEL.

No. 841,890.　　　Specification of Letters Patent.　　　Patented Jan. 22, 1907.

Application filed July 25, 1904. Serial No. 217,902.

*To all whom it may concern:*

Be it known that I, JOHN PEPPER, Jr., a citizen of the United States, residing at Utica, in the county of Oneida and State of New York, have invented certain new and useful Improvements in Fish-Reels, of which the following is a specification, reference being had therein to the accompanying drawings.

My invention relates to an improved reel for fishing uses; and I declare that the following is a full, clear, concise, and exact description thereof sufficient to enable one skilled in the art to make and use the same, reference being had to the accompanying drawings, in which like letters and numerals refer to like parts throughout.

My invention can be best understood from an examination of the specification and drawings; but it consists of a variety of parts and the construction, combination, and arrangement of the same.

It is illustrated in the form of a reel, such as is used for ordinary sportsman's purposes and which comprises in one article a variety of uses, it being constructed so that at the will of the operator it can be used as a simple reel or as a multiple reel or as an automatic spring-reel.

It also comprises several improvements, which will be specifically pointed out.

In the drawings, Figure 1 is a side view of the reel in place on the butt of a fishpole. Fig. 2 is a top view of the same. Fig. 3 is a cross-section view on line $z\ z$ of Fig. 3. Fig. 3ᵃ is a cross-section view of parts shown in Fig. 3, on a larger scale, to show particularly the mounting of the sleeves and the parts supported on each. Fig. 4 is a detail view showing the manner in which the reel is removably mounted on the base portion, which is secured to the pole. Fig. 5 is a detail view of a locking connection between the said base and the brake of the reel. Fig. 6 is a view on line $x\ x$ of Fig. 3 looking toward the pole with a portion of one of the plates cut away. Fig. 7 is an opposite view on line $x'\ x'$ of Fig. 3. Fig. 8 is a view on line $x''\ x''$ with the face and its attached members removed. Fig. 9 is a view of the face of the reel with the handle removed and a portion of the face cut away to show the parts supported on the opposite side of the face and the parts with which they engage. Fig. 9ᵃ is a side view in section of the face of the reel, showing dog 11 in relation to the block 13 and showing the beveled face of that block. Fig. 10 is a plan view on line $y\ y$ of Fig. 11 of the mounting of the handle. Fig. 11 is a sectional view on line $y'\ y'$ of Fig. 10, and Fig. 12 shows the brake-arm with line-guide thereon.

Referring to the figures more in detail, A represents a fishpole provided with the ordinary rings B for engaging the end of the usual base portion C. The base is extended parallel with the rod, as shown at D, and is pierced centrally to receive the pillar E of the reel, which has a case F, which is comprised of two portions designed in actual construction to be pressed out of metal suitably formed to fit together at the outer edges of the side, so as to form a spool for winding the line. The face of the reel is composed of a disk which is fixedly mounted on the outer end of the pillar E. The inner member of the cover or spool F is pierced centrally of its surface to receive and revolve upon the pillar E and has integral with or mounted on it a gear 1 and is provided on its opposite face with a suitable bushing to support the case and the reel against the base portion C. The pillar E extends through the reel, having a given diameter from its inner end to about the line $x\ x$, from which point it has a smaller diameter, on which is carried the sleeve 2. On the sleeve 2 is carried at a certain part thereof a sleeve 3, the purposes of which will be explained.

Fixedly mounted on the pillar E is a plate G, on the outer face of which is carried pinion 4 and on the inner side and on the same mounting the pinion or gear 5. It also carries on the same face a pinion 6, which engages with gear 5 and turns gear 7, mounted on the same bearing as pinion 6, and which engages with gear 1, which is integral with or fixed to the spool of the reel. It is thus seen that the power given to pinion 4 is transmitted through the series, so as to turn the casing or spool of the reel on the pillar E.

Outwardly from the point where G is mounted the pillar has a smaller diameter and carries the sleeve 2, on which is fixedly mounted plate H, which has secured thereto and to the sleeve 2 the gear 8. At a point near the periphery of the plate H is fixedly mounted spiral spring I. On sleeve 2 is now slipped a shorter sleeve 3, which carries a plate J, to which and to the sleeve is fixedly secured gear 9. The sleeve 3 extends inwardly to the plate H and has attached to it the other end of the spring I. Gear 9 is made up of two portions, (better shown in Fig. 8,)

the inner one being designed to engage with a pinion 10, which is operated by the handle, and the outer gear or ratchet wheel 9ª being constructed for engagement by a dog secured to a fixed part of the reel to hold the gears against turning. This dog is shown at 11 and is pivotally mounted about midway of its length to the front casing and is operated by button 12. The other end is provided with a tooth, as seen in Fig. 9.

Secured to the casing is a block 13, which has a beveled surface adjacent to the dog 11, so that when the button is pressed so as to carry the tooth of the dog away from gear 9ª the friction between the block 13 and the dog 11 holds the tooth away from the gear. On the other hand, there is a spring 14, which bears against the inner end of the dog and is securely mounted at the other end to the fixed part of the reel and the purpose of which is to keep the tooth of the dog against the gear except when it is secured in the other position. The outer end of the sleeve 2 carries a button 15, designed to slide freely on the sleeve, but not to turn thereon. Sleeve 2 has a key 2ª fixed on it, and button 15 is slotted to receive it. Thus the latter is turned with the sleeve, but may slide thereon. The button 15 has a nub 16, which fits in a corresponding recess in the gear 9ª, so that when the button is against the gear the two are held against separate turning.

In order that the button may be put out of engagement with the gear, I provide a spring 17, fixedly mounted at one end to the fixed part of the reel and at the other end engaging in a peripheral recess in the button, as shown at 18. Slidingly mounted in the face of the outer part of the case is a button or stud 19, its inner end in a given position of the button 19 pressing against the spring 17, and thereby holding the button 15 against gear 9ª. When the button 19 is moved to take its nub away from the spring 17, the button 15 flies away from the gear.

The pinion 10 is mounted on a bearing in the outer face of the reel and engages with the gear 9. The shaft on which it is mounted is adapted at the other end to receive the handle K.

On the base part C and shown as supported on the pillar E is mounted a brake-arm L, the same extending outwardly at one side substantially parallel to the pole, so that its outer end can be readily grasped with the fingers. Where the extension passes under the inner face of the casing it is curved so as to have a friction contact with said face, the member L being formed to bear at the said curved portion against the adjacent reel-casing. On the opposite side of the arm D, I fixedly mount spring d, and on the brake-arm L is a lug l'', which passes through the arm D and bears against the free end of the spring, which tends to press the curved part of member L against the reel and hold it against turning. In order that the brake may be secured out of contact with the reel, I provide a curved dog 20, which passes through the members L and D, being curved or bent so as to have a face to bear against the slanted part da of the member D. At its other end it has a button and is designed to be moved to and fro in a groove in arm L, so as to lock the brake away from the reel when desired. The brake-arm is provided with a line-guide L', extending therefrom across the face of the spool. It comprises two fingers which overlap at the ends, as indicated at lm, so that the line can be slipped in or out between such ends when it is desired to reverse the position of the reel on the pole. There is such a line-guide on each side of the spool, as indicated.

The handle K is removably mounted on the shaft or bearing K', so that it can be removed and seated on the knob K'', which is fixedly mounted on the periphery of the front edge of the casing. The construction of the handle is explained below; but it is made removable, so that it can be applied to the spool and the reel operated by the direct application of power instead of through the gears, making it in that way suitable for salt-water fishing, for instance.

We will assume that the dog 11 is out of engagement with the gear or ratchet wheel 9ª and that the button 15 is out of engagement with that gear. The handle is then turned to the right, which turns the gears 10 and 9 and the collar 3, the tendency of which is to wind the spring I. Instead of this being done, however, the plate H, on which the other end of the spring is mounted, is turned by force of the spring, and this carries gear 8, which in turn acts upon the pinion 4 and from there through the train to the gear 1 on the inner member of the case, the effect of which is to turn the spool or casing of the reel and wind or unwind the line. In this position of the parts the reel acts as a multiple reel when of course freed from the brake, and the line may be wound or unwound in the customary way.

If, again, the dog 11 be put into engagement with the ratchet or gear 9ª and the handle be then operated, the brake being in contact, the spring is wound up by the connection of its inner end with the sleeve 3 and tightened to any degree, and when the brake is released the line is drawn in. Again, the dog may be put into engagement and the line paid out, which winds the spring from the other end, and when the line is out it is under tension. If the brake be taken off, the reel operates as a multiple spring-reel, and the brake can be put on at any time, and the spring and the line put under tension by the winding of the spring through the turning of the handle.

It will be understood that when button 15 is in engagement with gears 9 and 9ª the effect is to lock the spring in any given position. This is because one end is attached to plate H, which is rigidly mounted on sleeve 2, and the other end is attached to sleeve 3, which is securely fixed to sleeve 2 through its connection with gears 9 and 9$^a$ and the fixed engagement of those gears with sleeve 2 through key 2$^a$, which is fixed on sleeve 2 and on which button 15 may move to and fro on sleeve 2.

It is immaterial whether the button is in engagement with the reel when the reel is used as a multiple reel. If it is not in engagement, the spring simply transmits the power from gear 9 to gear 8 and thence to the spool through the gear-train. If the button is in engagement, the effect is the same, the power passing through the button and sleeve 2 to gear 8. If, however, the inner end of the spring has been locked by means of the dog 11 and the line paid out and the spring then held under tension by merely connecting the sleeves and it is desired, the tension may be at once taken off the line by moving the button 19 so as to let the spring 17 carry the button 15 out of engagement, the effect of which is to permit the gear 9 and its sleeve 3 to turn freely and release the inner end of the spring. On the other hand, no matter what the condition of the line is the spring can be put under tension at any time by employing the dog 11 and held there by putting the button 15 into engagement.

I have already described the means by which the brake can be locked out of engagement, and it will therefore be seen that by my construction I have provided for a great variety of uses in a single structure, although I do not claim to have fully explained all the advantages which follow from such construction.

I will now describe the manner in which the reel is removably mounted on the base, which is particularly illustrated in Fig. 4. The base portion C has on one side a spring D', secured at one end and at the other end having an arm which passes through or across the base C. This arm $d'$ of the spring has an edge which normally lies across the space in which the pillar E is to be inserted, the pillar being milled or grooved by cutting segments out of the pillar on opposite sides, as at $d''$, to receive arm $d'$. The arm $d'$ has such edge cut away, as seen at $d'''$, so that when pressure is applied to the end of the arm against the tension of the spring the space $d'''$ registers with the opening for the pillar, which can then be removed or inserted.

The round pillar E is segmentally milled or grooved on opposite sides at its inner end, as at $d''$, so that the reel may be readily removed by pressing down the spring D' to release the pillar from the spring. The reel may be mounted in the base in reversed position, the spring engaging the other and opposite groove. The member D, which carries the brake, is pierced for the pillar to pass therethrough, and is thus held between the reel F and the base C, being maintained in position by friction-contact, though nubs $bd$ or other mechanical means may be provided. The brake may thus be brought above or below the reel.

The details of the handle are shown in Figs. 10 and 11. I illustrate the bar of the handle as made up of three portions $k, k'$, and $k''$, the two former of which are cut out to receive the end of the shaft K'. The part $k$ is cut out, as shown in Fig. 11, at $ka$, and the part $k'$ is also cut out, as shown at $k'a$, to provide room for a coil-spring $k'''$. The part $k'$ is further cut out to give room for bar $ke$, which has an upset at one end to bear against the coil-spring, and the other end of which is connected to part $k''$, which latter slides freely along the part $k'$, the latter being grooved for that purpose. The plate $kc$ has an opening $kb$, one part of which is slightly larger than the head of the shaft K', and the other end is narrower, so that its edges engage with slots in the head of the shaft K', which is better seen in block K'' in Fig. 3. When it is desired to remove the handle, the part $k''$ is slid toward the center, which pushes the bar $kc$ out of engagement with the shaft K'. The handle may be in the same way seated on the block K'', which is on the ring of the casing.

The knob of the handle is shown as N, the inner end of which has a portion $n$, which fits between the blocks $n'$ on the end of the handle or bar K.

$o$ is a spring fixedly mounted on the lower face of the handle, against the other end of which abuts the end of the knob N, which end is square, so that the handle N will maintain an upright or a horizontal position.

Having described my invention, what I claim as new, and desire to secure by Letters Patent, is—

1. In a reel, the combination with a spool of a spring therein with a separate attachment for each end, sleeves each mounted to actuate one end of the spring and operative on the one hand by the handle of the reel and on the other by turning the spool to wind the spring, means to hold the spool from turning, and means for connecting the sleeves to turn together, substantially as described.

2. In a reel comprising an arbor or spindle and a spool revolubly mounted thereon, a spring mounted in the reel with operative connection at one end with the spool, a sleeve revolubly mounted about the spindle having the other end of the spring connected therewith, and means for locking said sleeve from turning whereby the spring may be wound by turning of the spool and the unwinding of the line, substantially as described.

3. In a reel comprising a fixed base and a spool revoluble thereon, a spring operatively connected for winding at one end by the turning of the spool and at the other end by a handle, a brake to hold at will one end of the spring fixed by contact of the brake with the spool, means to hold at will the tension of the spring when applied by the use of the handle and means operative at will to secure the latter end of the spring in fixed connection with the other end and adapted to release it, substantially as described.

4. In a device of the character described comprising a reel member, sleeves supported within the same, a spring with operative connection at each end between said end and one of said sleeves, separate means mounted in operative connection with each sleeve for holding each of them at will whereby the adjacent end of the spring is held in a given position, means operatively connected with each of said sleeves whereby the spring may be wound from either end, substantially as described.

5. In a device of the character described comprising a spool member and a base member, sleeves supported within the reel member, a spring having fixed operative connection at each end with one of said sleeves, a handle for actuating one of said sleeves to wind the spring from its inner end and turn the sleeve supporting the other end of the spring to wind the reel, substantially as described.

6. In a device of the character described comprising a spool member and a base member, a spring mounted within the spool on sleeves revoluble therein, said sleeves, means for connecting the sleeves to revolve together, a handle for actuating one of the said sleeves to revolve the spring, and gear connections between the spring and the spool to revolve the latter as a multiple reel, substantially as described.

7. In a device of the character described, a base portion and a reel portion, the latter comprising a spool and an arbor, a spring mounted within the reel operatively connected at one end to the spool and at the other end operatively connected to the handle, means for holding the spool against rotation on the arbor, and means for winding the spring and placing it under the desired degree of tension together with means for holding the spring under such tension and instantly releasing the same, substantially as described.

8. A reel comprising a fixed spindle and a spool revolubly mounted thereon, a spring mounted within the spool, operatively connected at one end to the spool and at the other end to the handle of the reel, means for placing and holding the reel under any degree of tension, and means whereby the tension is independently held and instantly released substantially as shown.

9. In a reel comprising a spindle and a spool revolubly mounted thereon, a spring operatively connected at one end to turn the spool and operatively connected to the other end with a handle for transmitting the power for the revolution of the spool, means for securing the spool fixedly, and means for placing the spring under tension and securing the same but permitting instant release of the tension, substantially as shown.

10. In a reel, the combination with a spool of a spring therein attached at each end to a revoluble sleeve, sleeves each mounted to actuate its connected end of the spring, one being operative by the handle of the reel and the other by turning the spool, to wind the spring, a handle, means to hold at will the spool from turning and means to hold at will the handle end of the spring, substantially as shown.

11. In a reel, the combination with a spool of a spring therein attached at each end to a revoluble sleeve, sleeves mounted to wind the spring at each connected end, the one being operated by the handle of the reel and the other by the spool, means to hold at will the spool from turning and means operative at will to connect the sleeves to turn them together, substantially as shown.

12. In a reel, a spool, a spring, revoluble sleeves supporting the spring, operative means connected with one of said sleeves to wind the spring, means to secure and retain the tension applied to the spring and a brake adapted to hold the spool from turning, substantially as shown.

13. In a reel, a spool, a spring, sleeves supporting the spring, gears connecting one sleeve with the spool, gears connecting the other sleeve with the handle of the reel, said handle, means for connecting the sleeves to turn together and operate the reel as a multiple reel.

14. In a reel, a spool, a spring, separate operative means to wind the spring at either end, operative connections between one end of the spring and the spool, and a dog mounted on a fixed portion of the reel and adapted to hold the other end of the spring when being wound by turning of the spool by engagement of the dog with the spring-winding means connected with the latter end of the spring, said dog being adapted to permit release of the spring, substantially as shown.

15. In a reel, a spring, a spool, a handle, connections operative to wind the spring from each end, in one case by turning the spool and in the other case by the handle, a brake adapted to hold the spool means adapted to hold the other end of the spring, the said brake and the said holding means being each adapted instantly to release the spring at its own end.

16. In a reel, a base portion, a pillar mounted therein, said pillar being provided with a plate fixed thereon, the said plate bearing gears to engage with the reel-casing, a sleeve on the pillar provided with a plate fixed thereon, the said plate supporting a gear engaging with a train on the former plate and supporting one end of a spring, a sleeve mounted on the former sleeve provided with a plate fixed thereon, the said plate supporting a gear and a ratchet-wheel, operative connections for operating the latter gear, means for fixedly holding relative to the pillar the said ratchet-wheel, and means for separably connecting the two sleeves in combination, substantially as shown.

17. In a reel comprising a base portion and a spool portion, a brake-arm mounted on the base under tension of a spring to engage the spool portion, means for securing the brake free from the spool, said means comprising a sliding dog to engage the base portion of the reel, substantially as described.

18. In a reel of the character described, a base portion provided with a spring thereon, a brake-arm mounted on the opposite side of the base portion in engagement to receive the tension of the spring, a button mounted on the brake-arm provided with means for engaging the base, in combination, substantially as shown.

19. In a device of the character described, a base and a reel removably mounted thereon, the said base comprising a socket for the reel member and a spring having an edge normally intersecting the socket with means for pressing the edge out of such position, and a member on the reel portion adapted to be inserted in said socket and having grooves to receive the edge of the spring in its normal position, substantially as described.

20. In a device of the character described, a base and a reel removably mounted thereon, the said base comprising a socket for the reel member and a spring having an edge normally intersecting the socket with means for pressing the edge out of such position, and a member on the reel portion adapted to be inserted in such socket and having grooves to receive the edge of the spring in its normal position on either side of said base portion supporting the reel in reversible position on the base.

21. In a reel, a base portion and a reel portion, a spring-lock therebetween adapted to permit manual unlocking of the parts for removal of the reel and the parts supported on the base and the locking of the same to hold them in reversed position on the base, substantially as shown.

22. In a reel, a spindle and a spool revolubly mounted thereon, operative means within the reel for turning the spool by the operation of the handle, and a handle removably mounted on the outer face of the reel, and a separate stud on the periphery of the face of the reel for mounting the handle thereon, substantially as shown.

23. In a reel comprising a fixed base and a spool revoluble thereon, a removable handle, a stud on the outer face of the reel and a stud on the periphery of the face of the reel each adapted for mounting the handle thereon, substantially as shown.

24. In a reel comprising a base and a spool, line-clips extending outwardly from the base portion across the circumference of the spool, the said clips provided with overlapping tips and their outer ends separable to allow the slipping of the line between the ends and into the line-clips, substantially as shown.

25. In a reel comprising a fixed face-plate, a spring and a spool, a handle mounted on the said plate to operate the spring and its connected parts and removable therefrom for mounting on the spool, and a stud on the spool for the mounting of the handle, substantially as described.

In testimony whereof I affix my signature in presence of two witnesses.

JOHN PEPPER, Jr.

Witnesses:
JAMES H. MILLER,
E. T. DE GIORGI.